United States Patent [19]
Watt

[11] 3,827,766
[45] Aug. 6, 1974

[54] FLEXIBLE MEMBRANE BEARING

[76] Inventor: Gordon James Watt, Apt. 106, 245 Unquorua Rd., Fairfield, Conn. 06430

[22] Filed: July 6, 1971

[21] Appl. No.: 159,608

[52] U.S. Cl. ................................................. 308/9
[51] Int. Cl. ............................................ F16c 7/04
[58] Field of Search ............................ 308/9 A, 121

[56] References Cited
UNITED STATES PATENTS
3,434,761  3/1969  Marley ................................... 308/9
3,635,534  1/1972  Barnett ................................ 308/121

FOREIGN PATENTS OR APPLICATIONS
1,089,737  10/1954  France ................................... 308/9

Primary Examiner—Al Lawrence Smith
Assistant Examiner—Frank Susko
Attorney, Agent, or Firm—Ladas, Parry, Von Gehr, Goldsmith & Deschamps

[57] ABSTRACT

A low clearance pressurized fluid bearing with membrane surface suitably supported to allow bending and stretching in the clearance area in such manner to cause bearing action and to improve both load capacity and stiffness by its inherent tendency to compensate deficiencies in flow patterns.

4 Claims, 12 Drawing Figures

INVENTOR
Gordon J. Watt

INVENTOR
Gordon J. Watt

FLEXIBLE MEMBRANE BEARING

BACKGROUND OF THE INVENTION

Low clearance pressurized fluid bearings are known to operate on the basis of pressure gradients over the bearing area resulting from the balance of applied pressures and fluid flows which react with the bearing surfaces in the clearance region. Membrane bearing design and the theory of bearing operation are determined by the rules for fluid flow and the rules for elasticity generally described by harmonic functions and characterized by the partial differential equations of LaPlace, Poisson, Reynolds, and others.

Exact mathematical treatment for practical boundary conditions is next to impossible and so certain simplifications are made in this disclosure to describe principles of the flexible membrane bearing. The analysis presented is applicable to other types of bearings and is made to distinguish the membrane bearing from them and to show the reasons for its better performance. The preferred embodiment described in this disclosure is a journal bearing of the outlet restrictor type and is classed as a low clearance bearing.

Ordinarily hydrostatic bearings are designed with restrictions in the inlet or outlet passages to cause variations of pressure within the bearing area in such direction to oppose displacement caused by load. Outlet restrictor bearings are fed from a manifold which brings full line pressure to the entrance boundary of the bearing area. The outlet clearance is generally made narrower than the main bearing area clearance by fashioning steps, tapers, grooves, or pads into or on the bearing surfaces. Outlet restrictor hydrostatic bearings are prone to cross flows in the bearing area which deprive the high pressure regions of needed fluid.

Surface topology is usually produced by etching, machining, plating, or grinding the bearing surfaces. The flexible bearing surface derives its clearance geometry from the compliance designed into the membrane structure and the reaction of said structure with the fluid pressures over the bearing area. Since fluid flow is a function of the clearance and bearing clearance is a function of the pressure pattern, the flexible membrane bearing possesses a greater design freedom than the rigid bearings which constitute the present state of the art.

In low clearance bearings minor deformations which result from heat, pressure, vibration, or centrifugal force may cause drastic changes in bearing action. Close fitting surfaces are expensive to manufacture especially when they are modified by steps, grooves, or pads. It is well known that machining, etching, and grinding tend to change local stresses and deform the substrate. Low clearances of a few ten-thousandths of an inch over wide areas demands almost perfect geometry of the structure under all conditions of operation and at all times. The membrane bearing design and the manufacturing techniques made possible by the design improve structural stability and reduce potential manufacturing costs.

SUMMARY OF THE INVENTION

The present invention discloses means for producing bearing action between surfaces of matching shape by allowing one or both of the surfaces to deform in a selective manner from fluid pressures which develop when the bearing is activated and loaded. Membrane structure with edge support is employed to give the design freedom to control compliance of the bearing surfaces. Various modes of stretching, bending, and edge effects all play a part in determining the performance characteristics of these low clearance pressurized fluid bearings of the outlet restrictor type.

The preferred embodiment consists of a cylindrical bore with annular groove at the mid section and means for admitting fluid under pressure to the groove; a close fitting shaft comprising a thin membrane tube fitted over a spool, raised annular lands at the ends and mid section of the spool, and a bond between the tube and spool around the lands; and certain accessories not shown in the drawings, such as fluid supply, tubes and fittings for the fluid, and means for mounting the bearing and attaching useful loads. Those skilled in the art will recognize useful applications for this form of the flexible membrane bearing such as spindles for machine tools, measuring machines, and textile machines; and such as rollers for continuous manufacturing processes like thread, paper, film and foil; and for special devices like tape transports, optical scanners, gyroscopes, and mounts for grinding wheels.

Although the preferred embodiment chosen for example is considered to be the most useful form for employment of the membrane structure, other regular surfaces normally used for bearing designs may also be made into useful bearings in a similar manner to that described and with similar benefits. It is an object of the invention to define a bearing structure which is easily manufactured and reliable in use.

Normally two matching surfaces with constant clearance as described will not function as a hydrostatic bearing when a section of the periphery is fed by fluid under pressure. Others have conceived means to restrict the outlet clearance by dividing the bearing into distinct areas by steps, grooves, recessed pads, or tapers which require removal or deposit of material over the surfaces. An objective of my invention is to provide a continuous smooth surface over the bearing area of regular geometric form, such as cylindrical, conical, spherical, or planar, which conforms to a matching surface at constant clearance in the bearing assembly.

In the preferred configuration the shaft assembly fits the bore with a constant nominal clearance of a few ten-thousandths of an inch. When pressure and load is applied the membrane deforms a like amount in accordance with the compliance of its structure. This compliance is controlled by choosing Young's Modulus, thickness to diameter, length to diameter, and spacing and shape of the lands. Shape of the surface of the lands is important insofar as edge effects are concerned. It is an object of this invention to define the membrane and its supports so as to provide optimum compliance to the various modes of deformation as they relate to supply pressure, nominal clearance, and type of load.

When pressure is applied to the bearing and there is no load on the shaft, the membrane compresses symmetrically to the axis. This deformation is proportional to pressure in regions not directly adjacent to the lands. The deformation is called extensional in that it come primarily from a compression of the material around the circumference of the tube. Near the lands, edge effects act to blend the deformed sections into the circumference of the supported diameter. The overall effect is to produce a bias clearance which is greatest near the inlet, gradually reduces as pressure drops as a result of flow friction, and blends into nominal clearance at the outlet edge.

The membrane may bend when the bearing is loaded. Two important modes of inextensional deformation are bending as a beam without changing the circular cross section of the membrane tube and bending as a ring where the cross section is squeezed into an oval shape. Beam bending results in the middle portion of the tube between the lands moving in the opposite direction to displacement. Ring bending results in the middle portion being squeezed in at the top and bottom and being bulged out at the sides. Both of these modes improve bearing action if they are present in the proper proportion to other design parameters. It is an object of this invention to specify the means for optimizing the amount of beam and ring bending for any given bearing design.

Hydrostatic fluid bearings function as a type of positioning servomechanism actuated by fluid pressure and controlled by the reaction of pressure to fluid flow. For outlet restrictor bearings it is the outlet clearance changing with displacement which provides feedback to cause restoring action by modifying the pressure pattern in the bearing area. The pressure-flow relationship in the bearing is determined by boundary pressure conditions and clearances along the flow paths. Compliance of the membrane structure in the bearing area is key to the invention disclosed here. Proper proportioning of compliance in terms of the modes of deformation described is essential for optimum bearing performance. It will be shown by reference to the drawings how each mode of deformation affects the bearing action.

In consequence of the structural form of the supported membrane a method of manufacture is disclosed to show the practicality for precision and economy. For the preferred embodiment aluminum is selected for the shaft assembly. The aluminum tube is slipped on the spool after both have been machined to size. The assembly is then expanded into a cylindrical die and stress relieved in the compressed condition. On cooling it may be removed from the die without interference and in an unstressed state.

BRIEF DESCRIPTION OF THE DRAWINGS

FIG. 7 is for a high load bearing with constant clearance throughout the bearing area and an eccentric step at the ends. FIG. 8 is for a conventional step bearing. FIG. 9 is for the preferred embodiment of the flexible membrane bearing.

DETAILED DESCRIPTION OF THE DRAWINGS

Figure 1:
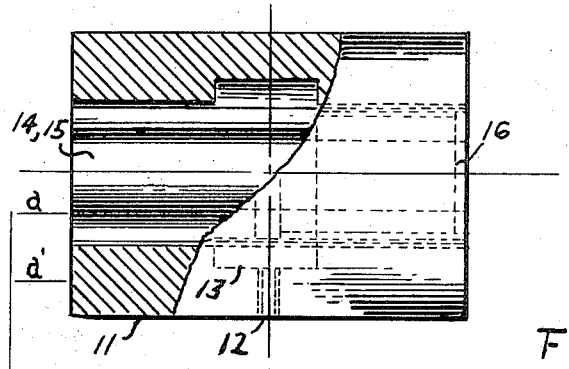
FIG. 1 shows a plan view of a bearing assembly in partial section with an end view.
Figure 1:
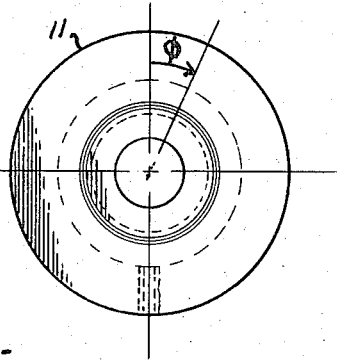

Referring now to the drawings and particularly to FIG. 1, details of the preferred embodiment are shown in typical proportions with some exaggeration of the membrane thickness and the bearing clearance. The bore is formed by producing a smooth cylindrical hole in a housing 11. Fluid under pressure is brought into the bearing through a radial hole 12 which leads through the housing into an annular groove 13 which relieves the cylindrical hole around the mid section and divides the bearing into two sets of bearing surfaces. Said annular groove is called the manifold and is made with sufficient depth to bring full line pressure around the shaft to the inlet periphery of the bearing areas.

The shaft assembly comprises a membrane tube 14 fitted over a spool 15. The membrane tube fits closely to raised portions of the spool called lands 16. These lands serve to support the edges of the tube and its center thereby stiffening it throughout the bearing.

Figure 2:
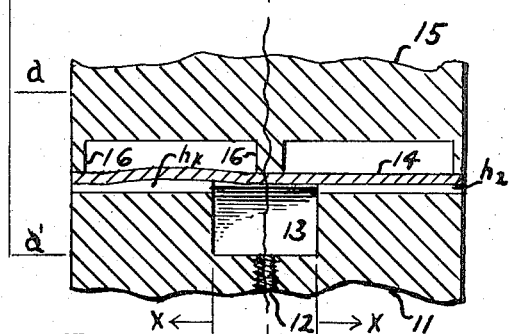
FIG. 2 is a section of the clearance area of FIG. 1 expanded and somewhat distorted in radial dimensions to show bending of the membrane tube when pressurized. The right hand section shows the bearing as built.

The bearing assembly FIG. 1 is shown centered and without pressure so that clearance between the shaft and bore is constant throughout and is equal to nominal clearance $h_2$ as depicted in FIG. 2. Further artistic license is taken with FIG. 2 to show detail in the bearing clearance area. Vertical scale of the cross section is distorted and the left hand portion is shown as the bearing is pressurized to produce bias clearance $h_x$. Bias clearance is constant around any section of the bearing but is variable along any cylindrical element. It depends on symmetrical compression of the membrane material and edge support which extends along the elements for a few membrane thicknesses.

Clearance around the manifold section may be of the order of one hundred times $h_2$. The extensional deformation which produces $h_x$ is only of the same order as $h_2$ possibly doubling or tripling it in some areas. Membrane thickness for the preferred embodiment may be twenty thousandths of an inch for the typical materials, pressures, and proportions described.

Figure 3:
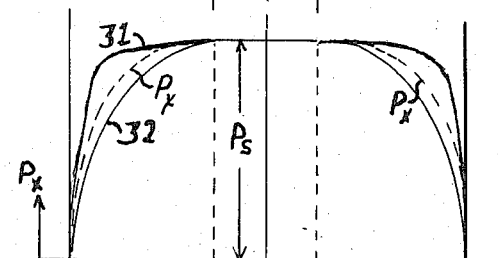
FIG. 3 is a graph showing bias pressure distribution along the axial direction for a typical flexible membrane bearing and for two limiting cases of clearance.

FIG. 3 is a graph showing bias pressure $p_x$ for the conditions depicted on the left hand portion of FIG. 2, when supply pressure $p_s$ is applied to the manifold with no load on the bearing shaft. Supply pressure may be of the order of several atmospheres, typically about 100 pounds per square inch. The abscissa $x$ is measured outward from the edge of the manifold in either direction along the cylindrical elements. Limiting cases are shown for reference. Curve 31 is the pressure distribution for a bearing where membrane deflection is large compared to nominal clearance $h_2$. This could result from high pressure or low clearance. In the limiting case pressure falls off with the one-fifth power of distance along the flow path.

Curve 32 represents the other extreme where membrane deflection is negligible compared with nominal clearance. Here pressure falls off with the square root of distance from the edge of the manifold. This pressure distribution is typical of the step bearing with compressible fluid. In typical design the flexible membrane bearing pressure curve varies with the one-third to one-fourth power of distance.

Figure 4:
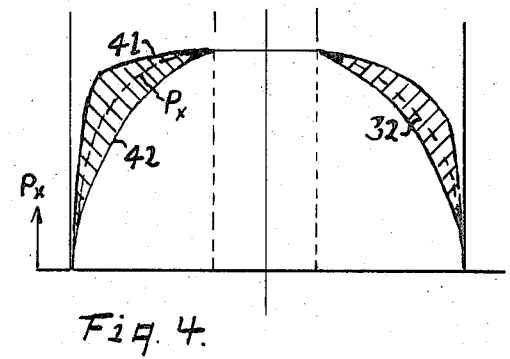
FIG. 4 compares the axial pressure distribution for a typical membrane bearing with that of a step bearing both under load conditions. Bias pressures are dotted.

FIG. 4 on the left hand side shows how bias pressure in the flexible bearing approaches the two limiting cases when the bearing is displaced. Curve 41 shows the pressure as it would tend to build up on the side which closes down and curve 42 for the opposite side. Force opposing the motion is related directly to the area between the curves as shaded. The right hand side of FIG. 4 depicts the same type of situation for a step bearing. The bias pressure falls off with the square root of distance as in the lower limiting case 32 of FIG. 3. The curve is also parabolic at the top and bottom when the bearing is displaced. It is to be noted that the shaded area is slightly less than for the flexible membrane bearing.

Figure 5:
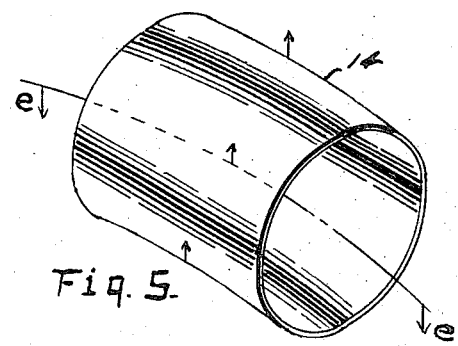
FIG. 5 depicts the beam type of bending for a flexible membrane bearing under load.

Inextensional deformations have a significant effect on performance of the flexible membrane bearing. Here the neutral surface of the membrane stretches very little whereas the membrane tends more to bend around its neutral surface. Beam type of bending is depicted in FIG. 5 where it is shown that the mid section of the tube moves oppositely to the eccentric displacement of its ends. Eccentricity $e$ is defined here as the proportion of nominal clearance $h_2$ moved when load is applied and its direction is in the direction of the load. Eccentricity implies a circular cross section. For the flexible membrane bearing the central sections of the tube remain round while the cylindrical elements bend. The tube bends away from the high pressure side and is least eccentric mid way between the supported ends.

Figure 6:
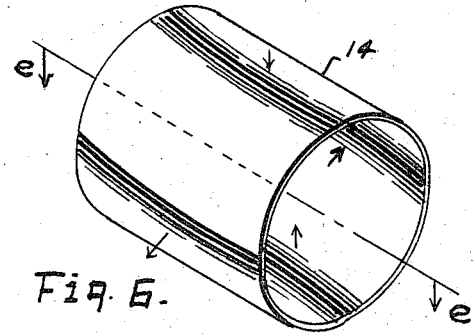
FIG. 6 depicts the ring type of bending which occurs in a flexible membrane bearing under load.

Another type of inextensional deformation is shown in FIG. 6. Annular sections of the tube become more oval toward the mid section between supports. This mode of bending produces no change in eccentricity along the tube. The mid sections are squeezed in at the top and bottom while the sides bulge out a similar amount. This deformation occurs because the pressure change between top and bottom is not symmetrical. The tube is squeezed, without bending its mean axis as defined by the average of its cylindrical elements.

Pressure-flow diagrams are presented to distinguish important performance characteristics of the flexible membrane bearing. The bearing area on one side of the bearing is unrolled so that it can be viewed normally in the direction of the radii. In these diagrams the manifold is on the left and the shaft is displaced toward the bottom. Outlet clearance is described by the expression $h = h_2(1 + e \cos\phi)$ where $e$ is unity and $\phi$ is defined in the end view of FIG. 1. Constant pressure lines run from top to bottom and are spaced at equal intervals of pressure squared. Flow lines are normal to pressure lines and are spaced at equal increments of mass flow rate.

Figure 7:
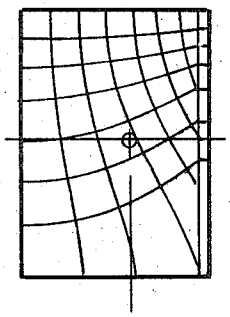
FIGS. 7, 8, 9 are pressure flow diagrams unrolled to be viewed normally in a two dimensional plot for the side of a bearing under load.

Pressures are continuous and continuity of mass flow is assumed. Laminar isothermal flow for a compressible fluid is assumed. Under these conditions mass flow rate is proportional to the gradient of pressure squared and is proportional to the cube of the clearance. FIG. 7 defines a standard case for reference where the sections enclosed by the pressure-flow lines are curvilinear squares. Clearance is constant throughout the bearing area. Such a bearing is disclosed by Adams in his U.S. Pat. No. 3,101,224 and described as a High Load Hydrostatic Bearing.

Figure 8:
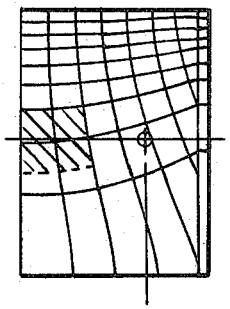

In contrast FIG. 8 depicts the case for a step bearing as disclosed by Adams in his U.S. Pat. No. 3,112,140. The step bearing is identical to the high load bearing in respect to nominal clearances and overall dimensions. When the step bearing is loaded so that the eccentricity of its outlet area is unity, eccentricity in the bearing area is described geometrically by $h_2/h_1$ where $h_1$ is the nominal clearance of the bearing area. Therefore the clearance of the step bearing when loaded is given by $h = h_1 (1 + eh_2/h_1 \cos\phi)$ throughout the bearing area. As a result the curvilinear squares enclosed by the pressure flow lines are foreshortened along the bottom and elongated along the top. Their distortion varies with the cube of the clearance. Along the central portion $\cos\phi = 0$ and the equilateral relation remains. This is shown by the shaded sections.

It is to be noted that the pressure flow pattern for the step bearing in FIG. 8 is less tilted than that for the high load bearing in FIG. 7. Also the flow lines in FIG. 8 are more crowded toward the top. These characteristics evidenced in the pressure flow diagrams indicate less lift for the step bearing and a higher consumption of fluid for the step bearing. A good estimation of lift can be made by the product of the slope at the points marked $o$ with the percentage distance along the bearing and the ratio of line pressure to line pressure plus the pressure at $o$. This point lies along the pressure line which intersects the bottom of the outlet area.

Figure 9:
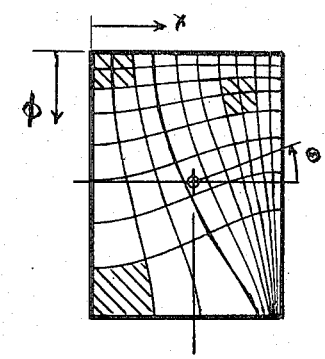

The important characteristics of the flexible membrane bearing can best be recognized by studying its pressure-flow diagram in relation to the foregoing drawings and previous discussion. FIG. 9 has been drawn with the same geometric and mathematical constants as the bearings in FIGS. 7 and 8. Regions of nominal clearance $h_1$ in the bearing area are indicated by the shaded curvilinear squares. In these regions the pressure-flow relationship is identical to the bearing in FIG. 7. In regions where the clearance is decreased by the net effects of shaft displacement and bending, the rectangles become foreshortened as along the bottom of the step bearing in FIG. 8.

One distinctive feature of the flexible membrane bearing is the gradual curvature of the pressure and flow lines in the outlet region. This is to be contrasted to the sharp break which occurs at the step in FIGS. 7 and 8. It indicates a gradual throttling of flow which results from the exponential decrease in clearance as the lands are approached. This edge effect permits higher supply pressures to be used since shock and turbulence will be minimized in the flow transition region.

Distribution of flow between the top and bottom is more even than the step bearing yet not so good as the high lift bearing. Maintenance of flow in the closed half is important especially when the outlet eccentricity is near unity. Fluid powers the servo action which accounts for the restoring forces. When the closed region is starved, the system saturates and stiffness falls off rapidly. In the upper half there may be plenty of flow to provide power but the sensitivity of pressure to flow at the outlet has been reduced considerably by the third power $h^3$ relation to clearance. Too much flow along the top causes a waste of power used to supply the fluid at pressure.

Figure 10:
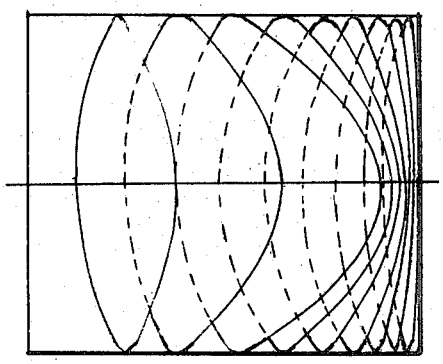
FIG. 10 shows a projection of the pressure lines of FIG. 9 as viewed from the bottom of the bearing.

The general shape of the pressure-flow pattern in FIG. 9 resembles the high lift bearing in FIG. 7. Inclination $\theta$ of the pattern at the central lift point $o$ indicates an improved lift condition over the step bearing. The lift point is further toward the manifold as in the high lift bearing. The most important thing to consider is the effect of these geometric characteristics on the difference between pressure at the top and at the bottom. In FIG. 10 the pressure pattern of FIG. 9 has been wrapped around the bearing and is viewed from the bottom. This projection of pressures on the bearing may be integrated graphically to obtain restoring force.

Qualitatively one can get a feel for the situation as shown in FIG. 10 by remembering that the pressure lines embrace areas of equal pressure and that pressure squared falls off in equal increments between each pressure line. The greatest lift is developed in areas where the greatest spacing between lift areas at the top and bottom overlap in the projection. This is toward the outlet end of the bearing along the center line in FIG. 10. Pressure differences between adjacent areas are greater toward the outlet because of the pressure squared relationship.

Figure 11:
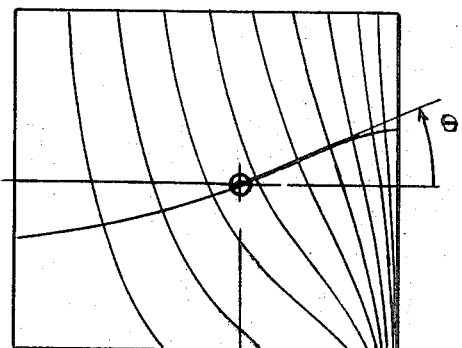
FIG. 11 shows a projection of the pressure lines of FIG. 9 and the central flow line from the side.

Constant pressure lines are shown in side projection in FIG. 11. The central flow line is shown passing through the central lift point at the inclination angle $\theta$. In this region the pressure-flow pattern is undistorted by curvature in the projection. In this view there is no overlap between different pressure areas. One can consider the lift developed over any equal pressure area as the pressure in that area multiplied by the difference in area between the top and bottom projected vertically as in FIG. 10. Integration over all the constant pressure areas leads to the conclusion that lift is proportional to inclination $\theta$ and most sensitive to changes in $\theta$ for longer bearings. The flexible membrane bearing has a high inclination angle as a result of the ring and beam modes of bending previously explained.

It can be seen by reference to FIG. 11 that pressure strips beyond the critical pressure line toward the outlet will contribute to a downward force. Therefore the crossing point of this line with the central flow line wants to be as far as possible toward the outlet. On the other hand the difference in area between the top and bottom of the strips forward of the critical pressure line is increased by the rate at which the tilt of the pressure lines increases with distance along the bearing. The crossing point cannot be advanced to the outlet while at the same time the tilt of the pressure lines is increased indefinitely. The optimum crossing point is just a little beyond center toward the outlet end, approximately the case for the flexible bearing disclosed in this invention.

Figure 12:
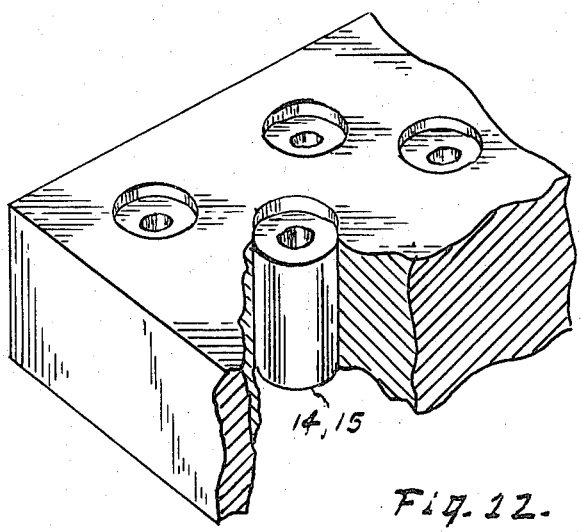
FIG. 12 depicts shaft assemblies in a die used to mould them into final shape during stress relieving.

FIG. 12 shows in perspective the type of die used in a critical part of the manufacturing process of the flexible membrane tube. Those familiar with the art are aware of the difficulties in making a long thin tube to close tolerances. The tube bends in the machining process and develops residual stresses which cause it to warp in use. If a surface finish is applied after the tube is shaped warping may also result. To correct for manufacturing deficiencies and to stress relieve the final assembly, the shaft assembly is placed in a die whose thermal coefficient of expansion is less than that of the shaft. When the lot is heated in an oven to the stress relieving temperature of the shaft material, the shaft has expanded in diameter to fill the hole with some radial compression. The resulting forces act to straighten the tube and make it round while the internal stresses are being relieved. This action also tends to improve the bonding condition between the tube and the lands.

The membrane shape is determined by the integrated effect of pressure over its surface and its compliance to the various modes of bending and stretching described in this disclosure. So far it has been assumed that ambient pressure prevails on the back side of the membrane surfaces. Pressure may be admitted to the back side of the membrane in various ways.

Viscous fluid may be inserted in the cavity between the back of the membrane and its supporting structure to provide damping of the membrane motion relative to the structure. Fluid may be inserted under pressure to vary the amount of extensional deformation and thereby change the bias pressure distribution. Fluid may be stored in a reservoir in the rotating member to provide a pressure behind the membrane which varies with rotor speed as a result of centrifugal force. Various combinations of damping and control are possible by using fluids of different viscosity and by providing membrane structures on both the rotating and stationary elements of the bearing.

The idea of deriving lift from the side projection of pressure-flow lines is to provide a feeling for the factors involved in maximizing bearing lift. The simple relation obtained puts this in terms of one pressure line, its pressure relative to supply pressure, its slope at the central flow line, and the distance from the manifold where it intersects the central flow line, the point marked $o$ in FIG. 11. The most sensitive factor is slope which can be maximized by shaping the flow contour. The modes of beam and ring bending have been shown to effect the slope of this critical pressure line.

For shorter bearings the lift is more sensitive to the axial crossing distance, which should be brought as far toward the outlet as possible. The ring mode of bending tends to accomplish this. The ring mode also tends to drop pressure at the crossing point, a factor which tends to increase lift. The ability to control the flow pattern by proper proportioning of the membrane and its supports is an important part of my invention. The structure itself is novel and is to be distinguished from foil bearings with perforations which admit fluid through the foil. It is also to be distinguished from outlet restrictor bearings which depend on defacing the bearing surface.

These and other points are covered in the claims.

I claim as my invention:

1. A hydrostatic bearing assembly comprising a pair of relatively movable bearing members having opposed complementary bearing surfaces of smooth configuration separated by a small clearance through which pressure fluid may be passed to provide bearing action, at least one of the bearing members including an imperforate flexible membrane, one side of said membrane constituting the bearing surface of said one bearing member, the other side of said membrane being connected in supported relation to raised annular lands of said one bearing member which permit extensional and inextensional deformations of the membrane in response to fluid pressure and bearing load, respectively.

2. A hydrostatic bearing assembly according to claim 1, wherein said opposed bearing surfaces are of complementary regular geometric forms.

3. A hydrostatic bearing assembly according to claim 1, wherein said flexible membrane is a cylindrical sleeve fitted over a spool having said raised annular lands disposed at its ends and at its mid section, the membrane and spool together constituting a cylindrical shaft serving as said one bearing member, the other bearing member being a housing whose bearing surface is defined by a smooth cylindrical bore in which said one bearing member is coaxially disposed, said bore being relieved as its mid section by an annular groove which serves as a manifold for connecting pressure fluid to said clearance between said opposed bearing surfaces from an inlet passage in the housing.

4. A hydrostatic bearing assembly according to claim 2, wherein said complementary opposed bearing surfaces are of cylindrical geometrical form.

* * * * *